US011150178B2

(12) United States Patent
Iguchi

(10) Patent No.: US 11,150,178 B2
(45) Date of Patent: Oct. 19, 2021

(54) SAMPLE-CONTAINER HOLDING MEMBER, LIGHT MEASUREMENT DEVICE, AND SAMPLE-CONTAINER PLACING METHOD

(71) Applicant: HAMAMATSU PHOTONICS K.K., Hamamatsu (JP)

(72) Inventor: Kazuya Iguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 330 days.

(21) Appl. No.: 16/316,125

(22) PCT Filed: May 9, 2017

(86) PCT No.: PCT/JP2017/017550
§ 371 (c)(1),
(2) Date: Jan. 8, 2019

(87) PCT Pub. No.: WO2018/020773
PCT Pub. Date: Feb. 1, 2018

(65) Prior Publication Data
US 2021/0131948 A1 May 6, 2021

(30) Foreign Application Priority Data
Jul. 27, 2016 (JP) .............................. JP2016-147251

(51) Int. Cl.
*G01N 21/15* (2006.01)
*G01J 3/02* (2006.01)
*G01N 21/64* (2006.01)
*G01N 21/03* (2006.01)

(52) U.S. Cl.
CPC ............ *G01N 21/15* (2013.01); *G01J 3/0202* (2013.01); *G01J 3/0254* (2013.01); *G01N 21/64* (2013.01);
(Continued)

(58) Field of Classification Search
CPC ............... G01N 21/15; G01N 21/64; G01N 2021/0325; G01N 2201/065; G01J 3/0202; B01L 3/5082; B01F 11/0008
See application file for complete search history.

(56) References Cited

U.S. PATENT DOCUMENTS 4,645,340 A 2/1987 Graham et al.
10,118,176 B2 * 11/2018 Gray .................... B01F 11/0008
(Continued)

FOREIGN PATENT DOCUMENTS

CN 102033055 A 4/2011
CN 102187203 A 9/2011
(Continued)

OTHER PUBLICATIONS

International Preliminary Report on Patentability dated Feb. 7, 2019 for PCT/JP2017/017550.
(Continued)

*Primary Examiner* — Maurice C Smith
(74) *Attorney, Agent, or Firm* — Faegre Drinker Biddle & Reath LLP

(57) ABSTRACT

A sample-container holding member is detachably attached to an integrator via a fixing member and holds a sample container, which comprises a cell containing a sample and a cap, in a state where the sample container is placed in the integrator. The sample-container holding member comprises a pillar-shaped support portion fixed to the fixing member and a container attaching portion which is provided at an end of the support portion in the axial direction and to which the sample container is attached. The container attaching portion comprises a housing portion housing a cap and a holding portion having contact with at least three points on an outer surface of the cell and holding the sample container.

13 Claims, 13 Drawing Sheets

(52) U.S. Cl.
CPC .............. *G01N 2021/0325* (2013.01); *G01N 2201/065* (2013.01)

(56) References Cited

U.S. PATENT DOCUMENTS

| | | | |
|---|---|---|---|
| 2002/0063864 A1* | 5/2002 | Honig | ............... G02B 7/008 356/326 |
| 2011/0255085 A1 | 10/2011 | Watanabe et al. | |
| 2016/0257584 A1* | 9/2016 | Lee | ............... C02F 1/722 |
| 2017/0212047 A1* | 7/2017 | Eura | ............... G01N 21/64 |

FOREIGN PATENT DOCUMENTS

| | | | | |
|---|---|---|---|---|
| CN | 104969061 A | | 10/2015 | |
| CN | 205139316 U | | 4/2016 | |
| JP | H05-113386 A | | 5/1993 | |
| JP | 2009031016 A | * | 7/2007 | ............ G01N 21/01 |
| JP | 2009-31016 A | | 2/2009 | |
| JP | 2009-103654 A | | 5/2009 | |
| JP | 2012/185189 A | | 9/2012 | |
| JP | 2016-53483 A | | 4/2016 | |
| TW | 201224437 A | | 6/2012 | |
| TW | 201224438 A | | 6/2012 | |
| WO | WO-2012/073567 A1 | | 6/2012 | |

OTHER PUBLICATIONS

"Operating Regulations for Drug Testing Instruments, Edition 2010", Headquarters Beijing: China Medical Science Press, Sep. 30, 2010, p. 879-p. 882, including Partial English-language translation.

* cited by examiner

Fig.8
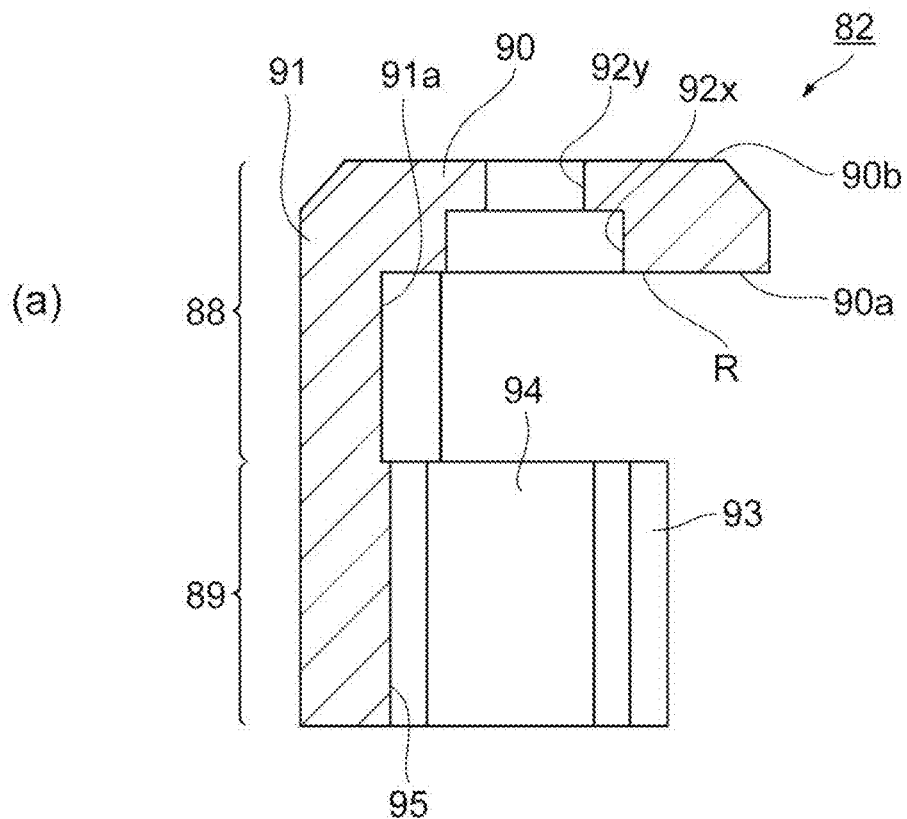
(a)
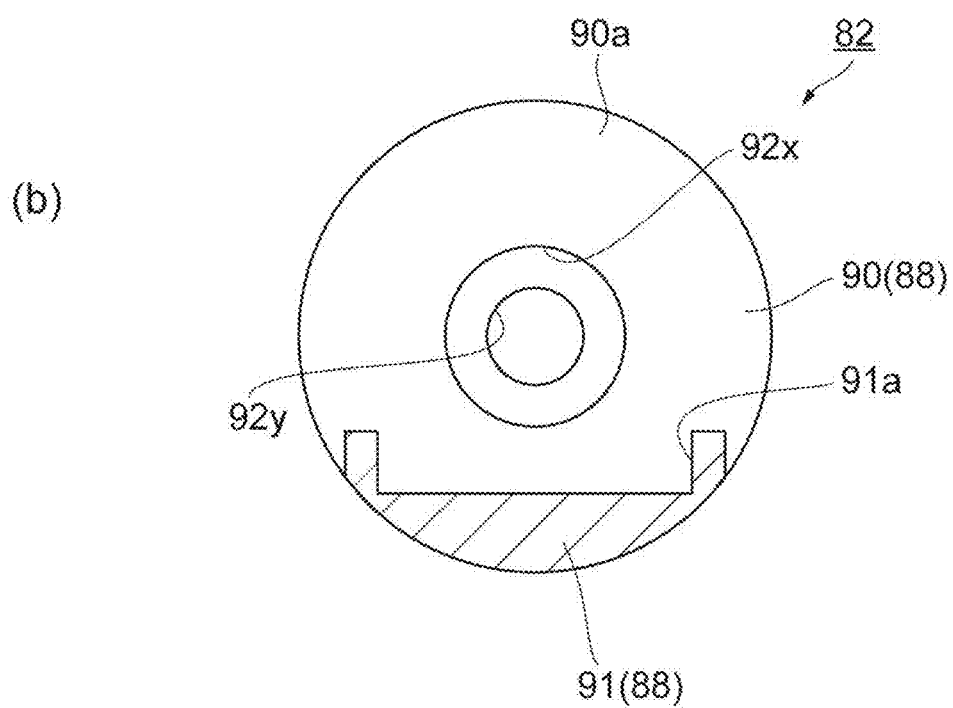
(b)

SAMPLE-CONTAINER HOLDING MEMBER, LIGHT MEASUREMENT DEVICE, AND SAMPLE-CONTAINER PLACING METHOD

TECHNICAL FIELD

One aspect of the present invention relates to a sample-container holding member, a light measurement device, and a sample-container placing method.

BACKGROUND ART

Conventionally, a light measurement device has been known which irradiates a sample to be measured with excitation light and measures measurement light generated by this irradiation. For example, Patent Literature 1 discloses a light loss measurement device which holds a sample in a state where the sample is placed in an integrator, by a clip of a sample holding means and irradiates the sample with the excitation light.

CITATION LIST

Patent Literature

Patent Literature 1: Japanese Unexamined Patent Publication No. H5-113386

SUMMARY OF INVENTION

Technical Problem

In the related art, since the sample is directly held by the clip, there is high possibility that the inside of the integrator is contaminated. Therefore, it is considered that the sample is contained in a sample container and is held. However, in this case, a cap of the sample container may be detached when the sample container is attached/detached to/from the clip, and there is a possibility that the sample leaks from the cell and contaminates the inside of the integrator.

An object of one aspect of the present invention is to provide a sample-container holding member, a light measurement device, and a sample-container placing method capable of reducing a possibility that leakage of a sample contaminates inside of an integrator.

Solution to Problem

A sample-container holding member according to one aspect of the present invention which is detachably attached to an integrator via a fixing member and holds a sample container which comprises a cell containing a sample and a cap in a state where the sample container is placed in the integrator, the sample-container holding member comprises a pillar-shaped support portion fixed to the fixing member and a container attaching portion provided at an end of the support portion in an axial direction and to which the sample container is attached, in which the container attaching portion comprises a housing portion housing the cap and a holding portion having contact with at least three points on an outer surface of the cell and holding the sample container.

In the sample-container holding member, the holding portion can reliably hold the cell, not the cap, while housing the cap in the housing portion. This makes it difficult for the cap to be detached when the sample container is attached/detached to/from the sample-container holding member, and leakage of the sample in the cell can be prevented. Therefore, a possibility that contamination in the integrator is caused by the leakage of the sample can be reduced.

In the sample-container holding member according to one aspect of the present invention, the holding portion may hold the sample container in a state where a longitudinal direction of the cell is inclined to one side or another side in an optical axis direction relative to a direction perpendicular to the optical direction of the excitation light to be emitted to the cell. According to this structure, all or a part of the excitation light reflected by the cell is prevented from returning to a direction of a light source of the excitation light.

In the sample-container holding member according to one aspect of the present invention, at least a part of a contact portion of the support portion with the fixing member may have a prismatic shape. According to this structure, rotation of the sample-container holding member relative to the fixing member in a rotational direction around an axis of the support portion can be prevented.

In the sample-container holding member according to one aspect of the present invention, the holding portion has an inner surface having a C-shaped cross section, and the inner surface may have contact with an outer surface of the cell to hold the sample container. With this structure, the cell of the sample container can be held by being fitted into the holding portion. That is, the sample container can be easily and detachably held.

In the sample-container holding member according to one aspect of the present invention, the holding portion may be formed of an elastic material. In this structure, when the sample container is attached/detached to/from the sample-container holding member, the C-shaped opening of the holding portion can be opened by using elasticity of the elastic material. With this structure, the sample container can be more easily held.

In the sample-container holding member according to one aspect of the present invention, an inner diameter of the C-shaped inner surface of the holding portion may be smaller than an outer diameter of the cell. In this structure, when the cell is held by the holding portion, a force to close the C-shape of the holding portion can be applied by using the elasticity of the elastic material. With this structure, the sample container can be more reliably held.

In the sample-container holding member according to one aspect of the present invention, in the C-shaped inner surface of the holding portion, a groove extending in a direction intersecting with the C-shaped cross section may be formed. With this structure, when the sample container is attached/detached to/from the sample-container holding member, the C-shaped opening of the holding portion can be easily opened by the groove.

In the sample-container holding member according to one aspect of the present invention, the support portion and the container attaching portion are separately formed, and the container attaching portion may be detachably fixed to an end of the support portion in the axial direction. In this structure, the container attaching portion fixed to the support portion can be replaced, for example, according to the shape of the sample container. Accordingly, the sample containers having various shapes can be easily held.

The sample-container holding member according to one aspect of the present invention may comprise a light shielding portion provided so as to surround the cap contained in the housing portion. With this structure, absorption of the excitation light by the cap can be prevented by the light shielding portion.

In the sample-container holding member according to one aspect of the present invention, the housing portion comprises a base portion facing a top surface of the cap and a side portion erected on the base portion, the base portion and the side portion define an accommodating space, and a gap may be formed between the cap accommodated in the accommodating space and the side portion. With this structure, a specific structure can be made so that the cap does not have contact with the sample-container holding member when the sample container is attached/detached to/from the sample-container holding member, and it can be more difficult to remove the cap.

A light measurement device according to one aspect of the present invention is a light measurement device which measures measurement light generated by irradiating a sample with excitation light, the light measurement device comprises the sample-container holding member, an integrator in which the sample container is placed, a fixing member that detachably attaches the sample-container holding member to the integrator, a light generation unit that generates the excitation light, a light detector that detects the measurement light, and an analysis unit that analyzes detection result of the light detector.

Since the light measurement device comprises the sample-container holding member, a possibility that contamination in the integrator is caused by the leakage of the sample can be reduced.

A sample-container placing method according to one aspect of the present invention for placing a sample container comprising a cell containing a sample and a cap in an integrator via a fixing member by a sample-container holding member which comprises a support portion and a container attaching portion provided at an end of the support portion in an axial direction, the container attaching portion comprises a housing portion and a holding portion, the sample-container placing method comprises a support portion fixing step of fixing the support portion to the fixing member, a container attaching step of attaching the sample container to the container attaching portion, and a container placing step of placing the sample container in the integrator, in which in the container attaching step, while the cap is contained in the housing portion, the sample container is held by making the holding portion have contact with at least three points on an outer of the cell.

In the sample-container placing method, the holding portion can reliably hold the cell, not the cap while the housing portion contains the cap. This makes it difficult for the cap to be detached when the sample container is attached/detached to/from the sample-container holding member, and leakage of the sample in the cell can be prevented. Therefore, a possibility that contamination in the integrator is caused by the leakage of the sample can be reduced.

In the sample-container placing method according to one aspect of the present invention, in the container placing step, the sample container may be placed in a state where a longitudinal direction of the cell is inclined to one side or another side of an optical axis direction relative to a direction perpendicular to the optical axis direction of the excitation light to be emitted to the cell. In this case, all or a part of the excitation light reflected by the cell can be prevented from returning toward the excitation light source.

In the sample-container placing method according to one aspect of the present invention, in the container attaching step, the sample container may be attached to the holding portion by being fitted into the holding portion. In this case, the sample container can be easily and detachably held.

In the sample-container placing method according to one aspect of the present invention, before the container attaching step, the container attaching portion provided in the support portion may be replaced with another container attaching portion different from the container attaching portion. In this case, the sample containers having various shapes can be easily held.

Advantageous Effects of Invention

According to one aspect of the present invention, a sample-container holding member and a light measurement device capable of reducing a possibility that leakage of a sample contaminates inside of an integrator.

BRIEF DESCRIPTION OF DRAWINGS

FIG. 3($b$) is a side view of the fixing member and the sample-container holding member.

FIG. 6($b$) is a cross-sectional view taken along a line A-A in FIG. 6($a$).

FIG. 7($b$) is a bottom view of the container attaching portion of the sample-container holding member.

FIG. 8($a$) is a cross-sectional view taken along a line B-B in FIG. 7($a$). FIG. 8($b$) is a cross-sectional view taken along a line C-C in FIG. 7($a$).

FIG. 9($b$) is a diagram of a continuation of FIG. 9($a$).

FIG. 12($b$) is a side view of a sample-container holding member according to still another modification.

DESCRIPTION OF EMBODIMENTS

Figure 1:
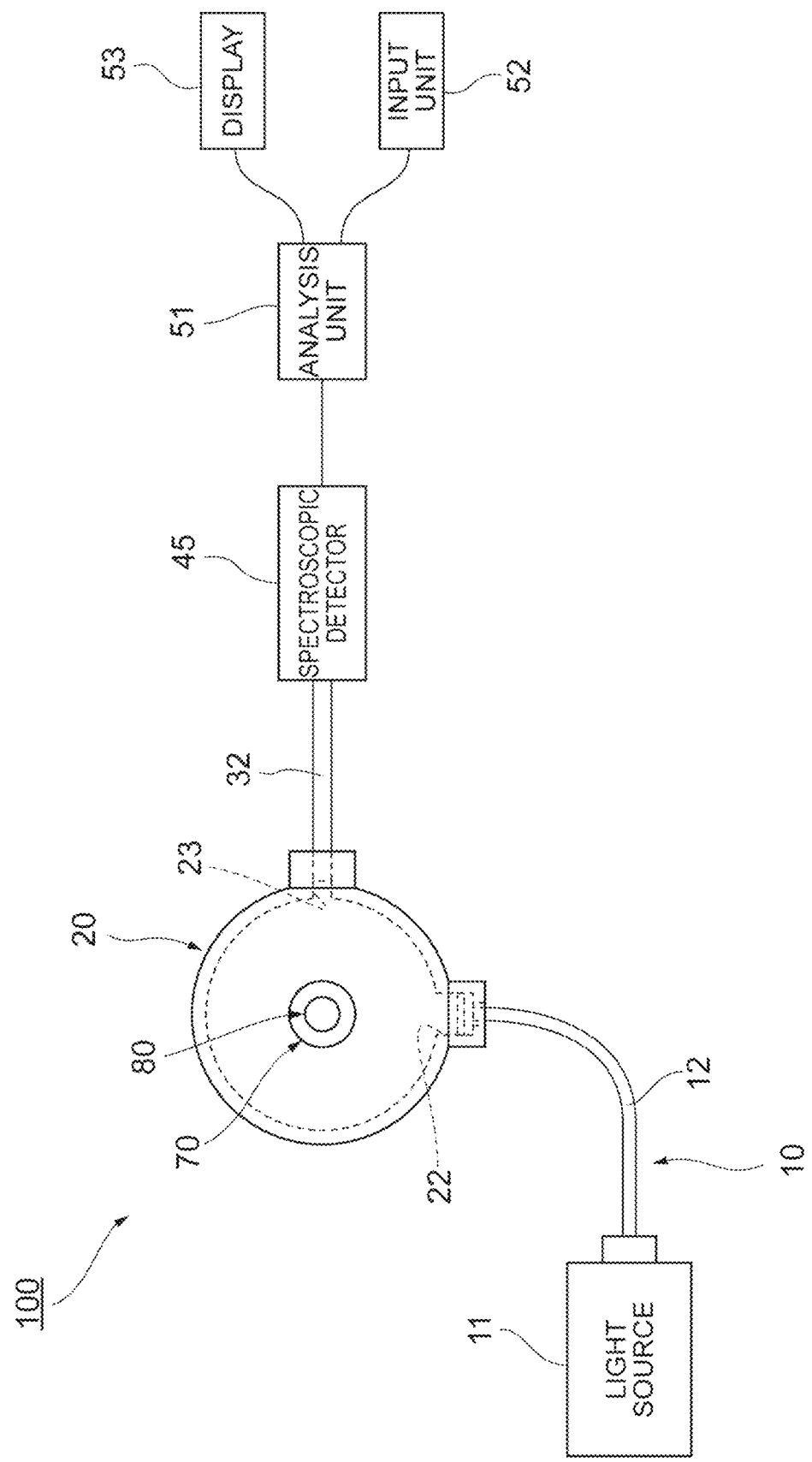
FIG. 1 is a diagram schematically illustrating a configuration of a light measurement device according to one embodiment.

Hereinafter, an embodiment of the present invention will be described in detail with reference to the drawings. In the following description, same or corresponding components are denoted with the same reference numeral, and overlapped description will be omitted.

Figure 2:
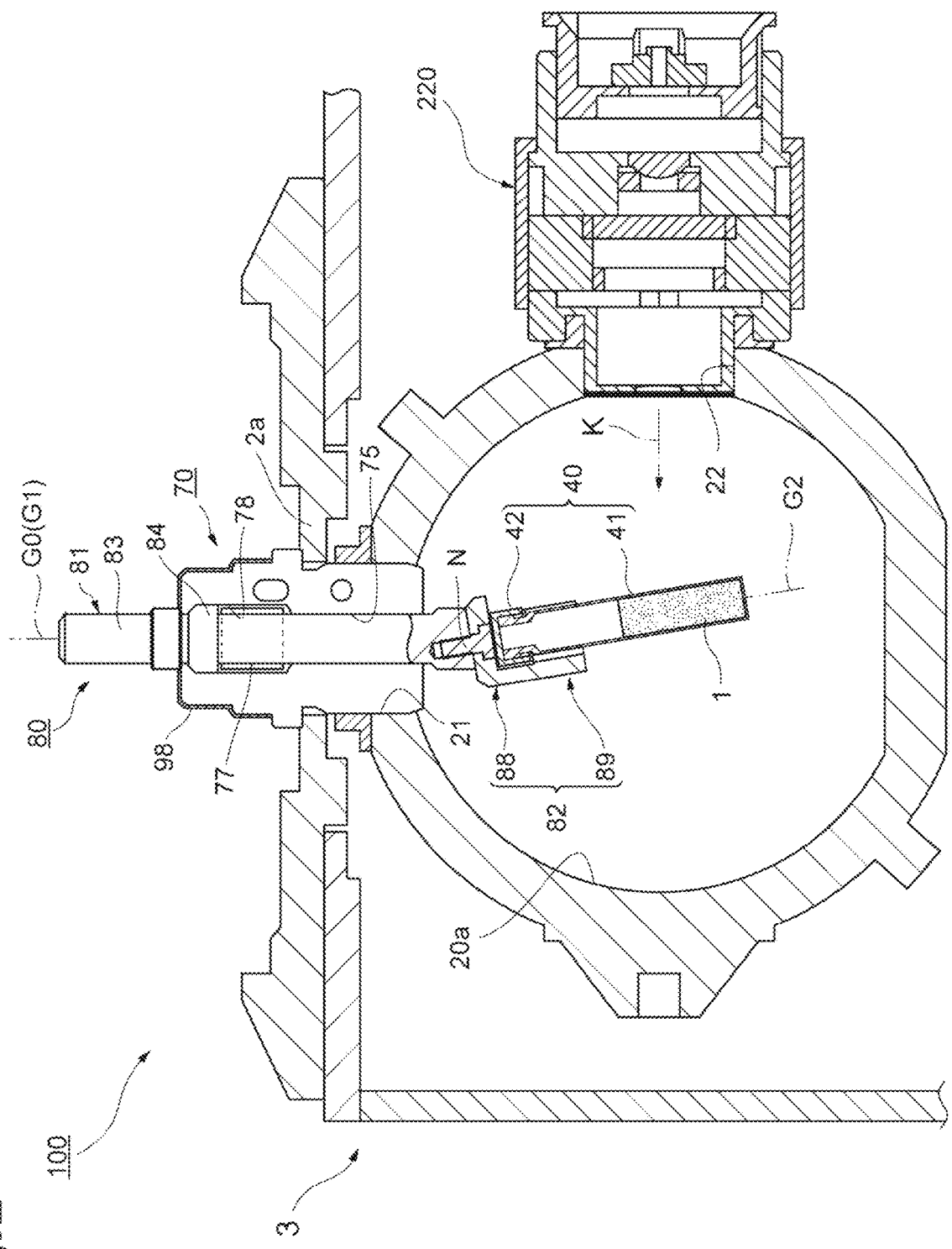
FIG. 2 is a side sectional view of a main part of the light measurement device in FIG. 1.

FIG. 1 is a diagram schematically illustrating a configuration of a light measurement device according to one embodiment. FIG. 2 is a side sectional view of a main part of the light measurement device in FIG. 1. As illustrated in FIGS. 1 and 2, a light measurement device 100 according to the present embodiment measures or evaluates optical characteristics such as fluorescence characteristics of a sample 1 as a sample to be measured by a photoluminescence method (PL method). The sample 1 is, for example, a fluorescent sample such as an organic electroluminescence (EL) material or a luminescent material for a white light emitting diode (LED) or a flat panel display (FPD). As the sample 1, for example, a powder, liquid, solid, or thin film-shaped sample can be used. Here, the sample 1 is a liquid sample in which a dye or the like is mainly dissolved, and is contained in a sample container 40.

The sample container 40 includes a cell 41 and a cap (lid) 42. The cell 41 is a container in which the sample 1 is placed. The cell 41 has a bottomed cylindrical shape. The cell 41 is formed of glass or the like. The cap 42 is detachably provided at an opening end of the cell 41. The cap 42 seals the inside of the cell 41. As the cap 42, a cylindrical cap is used. An outer diameter of the cap 42 is larger than an outer diameter of the cell 41. Such a sample container 40 is a general container for containing a sample. As the sample container 40, a widely distributed general-purpose product can be used. The shape and the material of the sample container 40 are not particularly limited, and various known sample containers can be used. For example, instead of the cell 41 having a cylindrical outer shape, a cell having a prismatic outer shape or the like may be used.

As the optical characteristics, an absorption rate, an internal quantum efficiency (light emission quantum yield), and an external quantum efficiency can be exemplified The absorption rate is a parameter regarding the number of photons to be absorbed. The internal quantum efficiency is a parameter regarding a rate of the number of photons of light emitted by light emission relative to the number of photons of light to be absorbed. The external quantum efficiency is a parameter regarding the number of photons to be emitted. The external quantum efficiency is a product of the absorption rate and the internal quantum efficiency. The absorption rate has a front-back relationship with a reflectance which is a parameter regarding the number of photons to be reflected. The absorption rate is synonymous with "1−reflectance".

The light measurement device 100 includes an excitation light supply unit 10, an integrator 20, a spectroscopic detector (light detector) 45, an analysis unit 51, an input unit 52, and a display 53. The excitation light supply unit 10 supplies excitation light with a predetermined wavelength to the integrator 20. The excitation light supply unit 10 includes an excitation light source (light generation unit) 11 and an incident light guide 12. The excitation light supply unit 10, the integrator 20, and the spectroscopic detector 45 are optically connected to each other. The spectroscopic detector 45 and the analysis unit 51 are electrically connected to each other.

The excitation light source 11 is a light source for generating excitation light and includes, for example, a xenon lamp or a spectroscope. The wavelength of the excitation light generated by the excitation light source 11 may vary. The excitation light source 11 can variably set the wavelength of the excitation light within a wavelength range of, for example, 250 nm to 1600 nm. The incident light guide 12 guides the excitation light generated by the excitation light source 11 to the integrator 20. As the incident light guide 12, for example, an optical fiber can be used.

The integrator 20 is an integrating sphere and has a hollow spherical shape. The integrator 20 is attached to a frame 3 with, a mounting screw (not shown). An inner surface 20*a* of the integrator 20 is coated with a high-diffusion reflective substance such as barium sulfate or formed of a highly reflective material having a reflectance close to one such as PTFE or Spectralon (registered trademark). The integrator 20 has a sample introducing opening 21 for introducing the sample 1. A fixing member 70 is inserted into and detachably attached to the sample introducing opening 21. A sample-container holding member 80 is fixed to the fixing member 70. The sample-container holding member 80 holds the sample container 40 in a state where the sample container 40 is placed in the integrator 20 (to be described in detail later).

In the integrator 20, an incident opening 22 to which excitation light enters and an emission opening 23 through which measurement light is emitted are provided. An incident light guide holder 220 for connecting the incident light guide 12 to the integrator 20 is inserted into and attached to the incident opening 22. The excitation light emitted from the incident light guide 12 is irradiated on the sample 1 in the integrator 20.

In the integrator 20, the excitation light entered from the incident opening 22 is multiply diffused and reflected. In the integrator 20, generation light generated by the irradiation on the sample 1 with the excitation light is multiply diffused and reflected. Then, the measurement light including the excitation light and the generated light is emitted from the emission opening 23. The measurement light emitted from the emission opening 23 is guided to the spectroscopic detector 45 in a subsequent stage via an emission light guide 32. The center lines of the sample introducing opening 21, the incident opening 22, and the emission opening 23 pass through the center of the integrator 20 and are orthogonal to each other.

The spectroscopic detector 45 detects the measurement light. Wavelength spectrum data of the detected measurement light is output to the analysis unit 51 in the subsequent stage. As the spectroscopic detector 45, for example, a back-thinned (BT)-CCD linear image sensor, a CMOS linear image sensor, or an InGaAs linear image sensor can be used. The analysis unit 51 analyzes detection result of the spectroscopic detector 45. The analysis unit 51 is, for example, a computer. The analysis unit 51 includes, for example, a central processing unit (CPU) which is a processor, a random access memory (RAM) or a read only memory (ROM) which is a recording medium, and the like. The analysis unit 51 operates by causing hardware such as the CPU and the RAM to read a program and the like. The analysis unit 51 causes the CPU to perform necessary data analysis on the wavelength spectrum data generated by the spectroscopic detector 45 and to obtain information on the sample 1. The analysis unit 51 causes the CPU to read and write from/to the RAM. The analysis unit 51 may be a field-programmable gate array (FPGA), a microcomputer, a smart device, or a cloud server. The input unit 52 and the display 53 are electrically connected to the analysis unit 51. The input unit 52 is used to input an instruction regarding data analysis, input an analysis condition or a measurement condition, and the like. The input unit 52 is, for example, an input device such as a mouse, a keyboard, and a touch panel. The display 53 is used to display the obtained data analysis result and the like. The display 53 is a display and the like.

Figure 3:
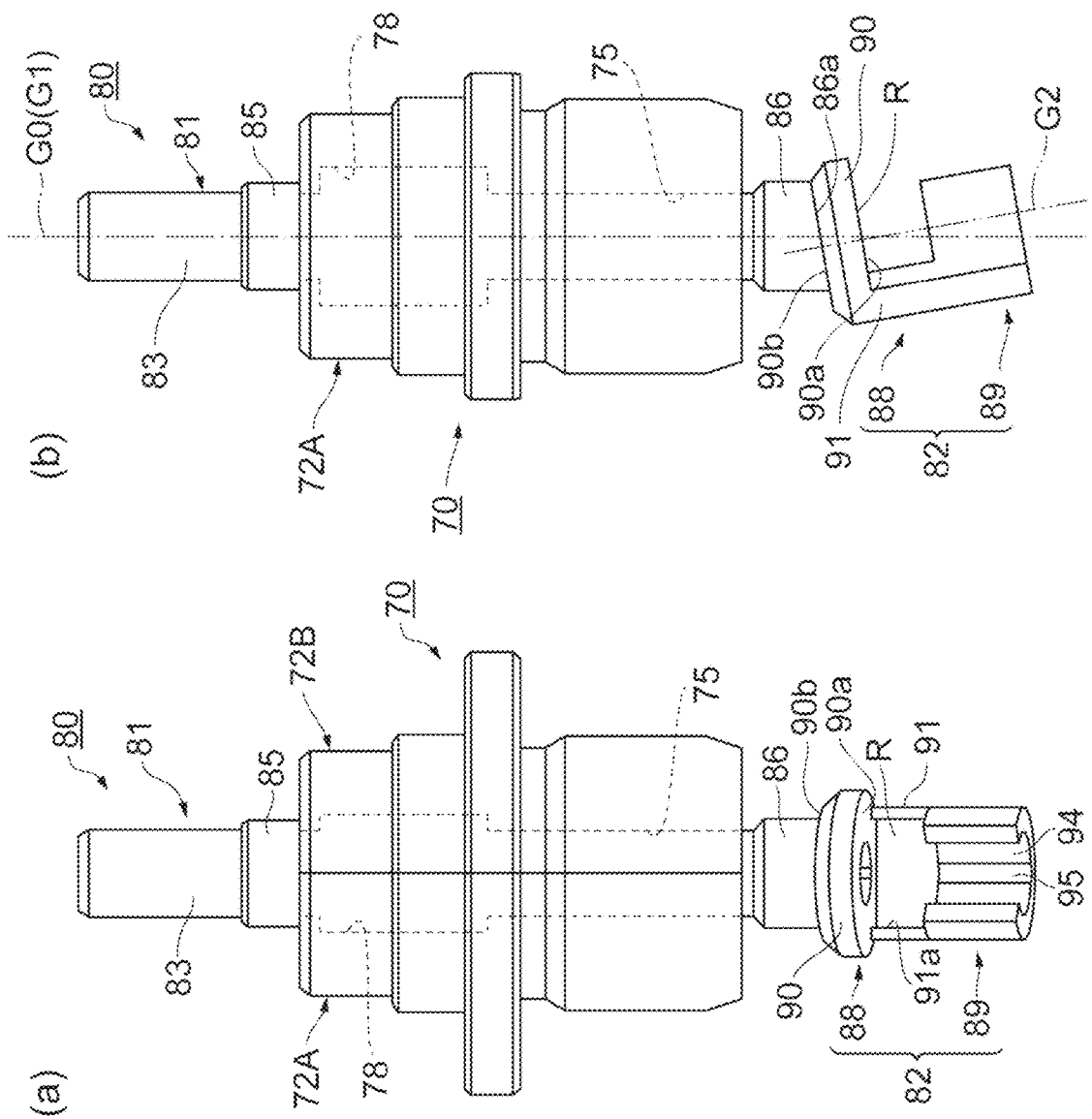
FIG. 3($a$) is a front view of a fixing member and a sample-container holding member.
Figure 4:
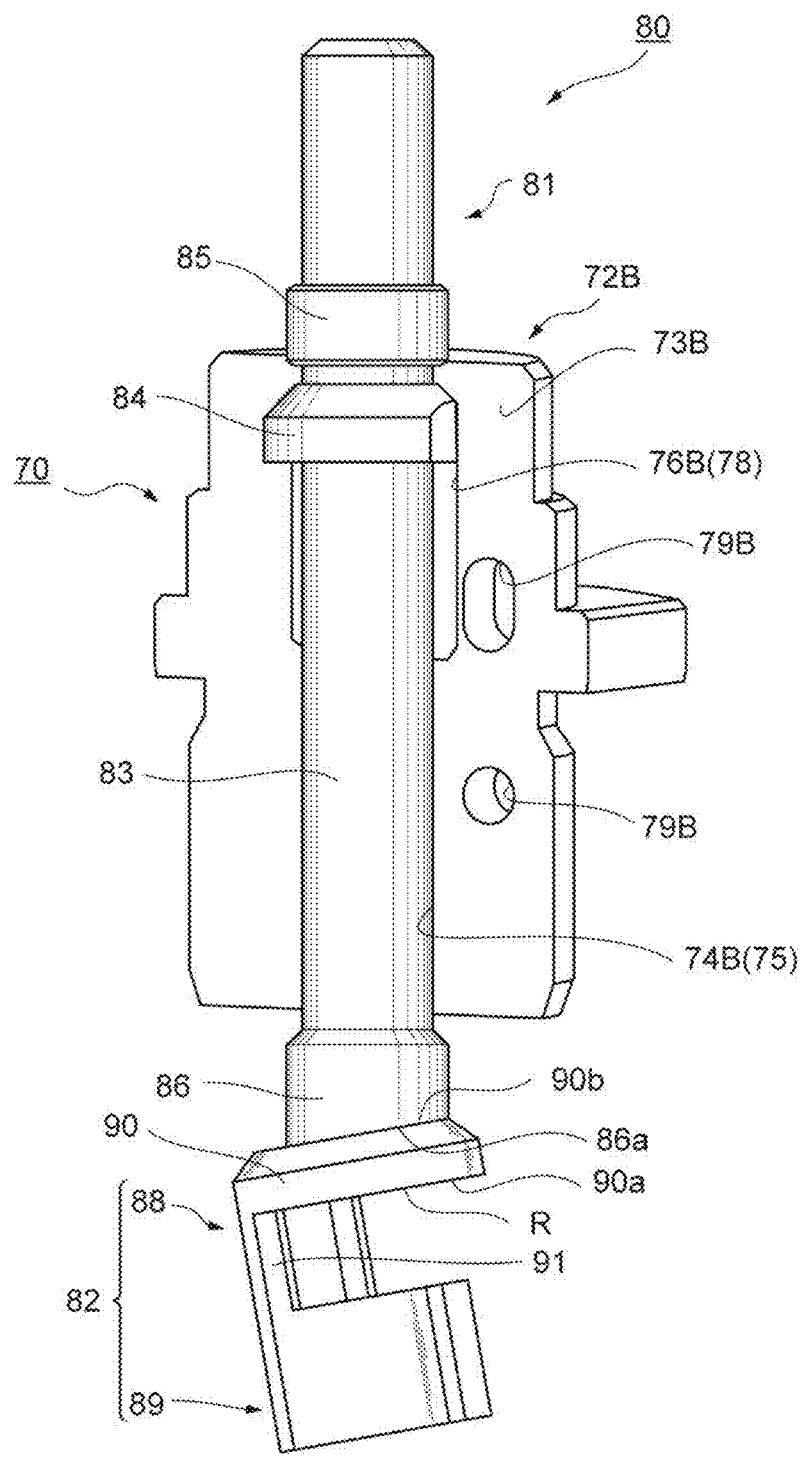
FIG. 4 is a perspective view of the divided fixing member and sample-container holding member.

FIG. 3(*a*) is a front view of the fixing member 70 and the sample-container holding member 80. FIG. 3(*b*) is a side view of the fixing member 70 and the sample-container holding member 80. FIG. 4 is a perspective view of the divided fixing member 70 and sample-container holding member 80. As illustrated in FIGS. 2 to 4, the light measurement device 100 includes the fixing member 70 and the sample-container holding member 80 including a support portion 81 and a container attaching portion 82.

Figure 5:
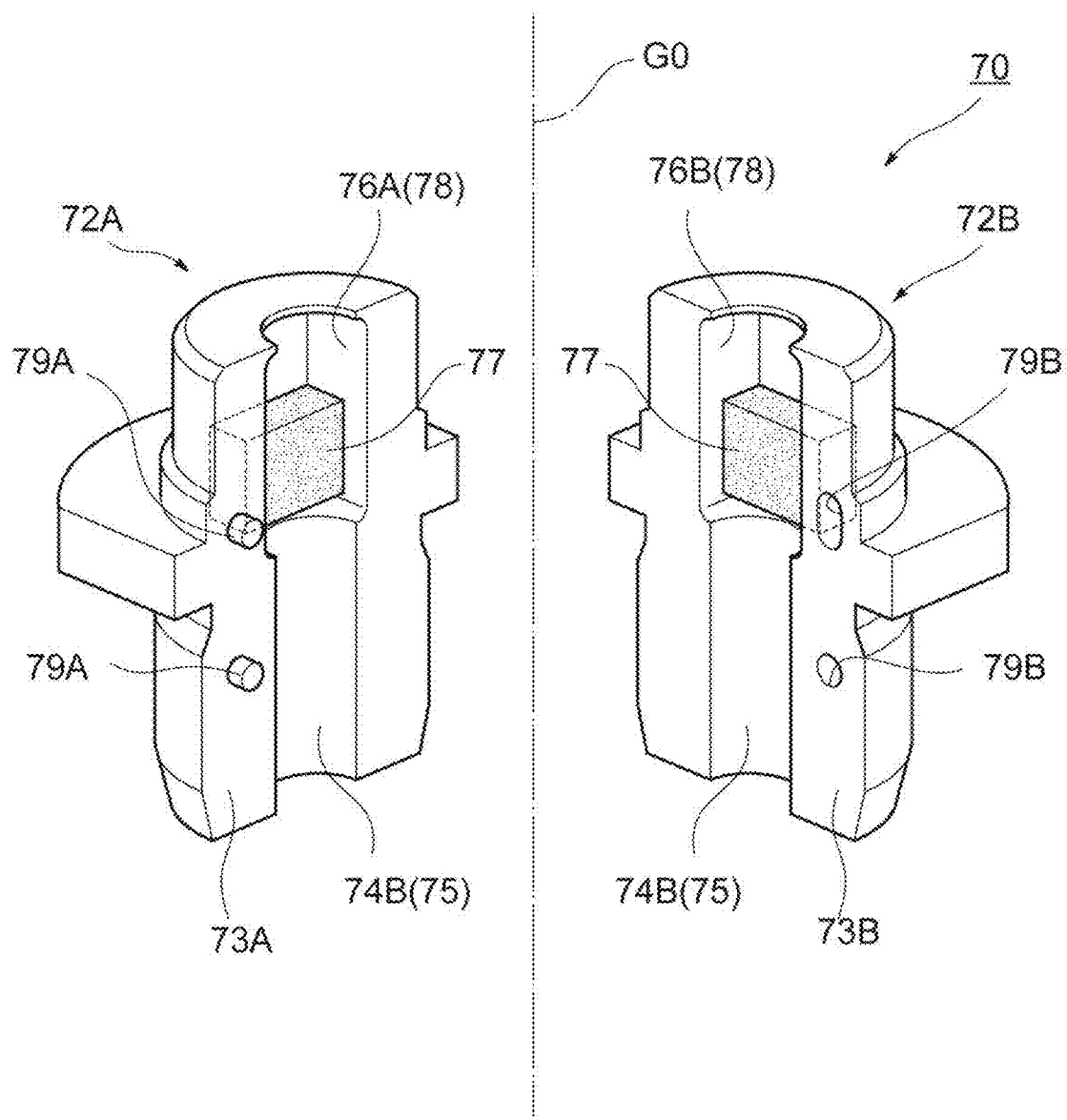
FIG. 5 is a perspective view of the divided fixing member.

FIG. 5 is an exploded perspective view of the fixing member 70. As illustrated in FIGS. 2 to 5, the fixing member 70 detachably attaches the sample-container holding member 80 to the integrator 20. The fixing member 70 has a cylindrical shape having a central axis G0. The fixing member 70 is formed to be divided into two pieces in the circumferential direction and includes a first semi-cylindrical portion 72A and a second semi-cylindrical portion 72B. It is assumed that the first semi-cylindrical portion 72A and the second semi-cylindrical portion 72B have the same shape. The first semi-cylindrical portion 72A and the second semi-cylindrical portion 72B are butted with each other in a direction orthogonal to the central axis G0. A cap member 98 (refer to FIG. 2) is attached to the first semi-cylindrical portion 72A and the second semi-cylindrical portion 72B which are butted with each other. As a result, the first semi-cylindrical portion 72A is fastened to and is integrated with the second semi-cylindrical portion 72B in the butting direction.

A groove 74A having a semicircular cross section and extending along the central axis G0 is formed in a butting surface 73A of the first semi-cylindrical portion 72A with the second semi-cylindrical portion 72B. A groove 74B having a semicircular cross section and extending along the central axis G0 is formed in a butting surface 73B of the second semi-cylindrical portion 72B with the first semi-cylindrical portion 72A. The grooves 74A and 74B form a cylindrical hole 75 of the fixing member 70 in a state where the first semi-cylindrical portion 72A and the second semi-cylindrical portion 72B are butted. The cylindrical hole 75 is a circular hole passing through the fixing member 70 along the central axis G0. An inner diameter of the cylindrical hole 75 corresponds to an outer diameter of a support column body 83 of the support portion 81 (to be described later).

One end of the groove 74A in the axial direction has a rectangular recess 76A having a rectangular cross section. A rectangular plate-shaped elastic member 77 formed of silicone resin and the like is bonded and fixed to a bottom surface of the rectangular recess 76A. Similarly, one end of the groove 74B in the axial direction has a rectangular recess 76B having a rectangular cross section. The elastic member 77 is bonded and fixed to a bottom surface of the rectangular recess 76B. The rectangular recesses 76A and 76B forms a rectangular hole 78 form at one end of the cylindrical hole 75 in a state where the first semi-cylindrical portion 72A and the second semi-cylindrical portion 72B are butted with each other. The rectangular hole 78 is a rectangular-shaped space formed by enlarging one end of the cylindrical hole 75. The rectangular hole 78 has a shape corresponding to a prism portion 84 of the support portion 81 (to be described later).

On the butting surface 73A of the first semi-cylindrical portion 72A, a cylindrical projection 79A is provided. On the butting surface 73B of the second semi-cylindrical portion 72B, a cylindrical depression 79B is provided. In a state where the first semi-cylindrical portion 72A and the second semi-cylindrical portion 72B are butted with each other, the projection 79A is fitted into the depression 79B, and a positional misalignment of the first semi-cylindrical portion 72A and the second semi-cylindrical portion 72B is prevented.

In such a fixing member 70, the support portion 81 of the sample-container holding member 80 is inserted into the cylindrical hole 75. The first semi-cylindrical portion 72A and the second semi-cylindrical portion 72B which are butted and integrated with each other hold and sandwich the support portion 81. With this arrangement, the fixing member 70 fixes the sample-container holding member 80. The fixing member 70 is inserted into the sample introducing opening 21 of the integrator 20 so that the container attaching portion 82 of the sample-container holding member 80 is placed in the integrator 20. In this state, the fixing member 70 is detachably fixed to a base 2a of the frame 3 with a screw and the like.

As illustrated in FIGS. 2 to 4, the sample-container holding member 80 is detachably attached to the integrator 20 via the fixing member 70. The sample-container holding member 80 holds the sample container 40 in a state where the sample container 40 is placed in the integrator 20. Here, the sample-container holding member 80 makes the sample container 40 (sample 1) be placed at the center in the integrator 20. The sample-container holding member 80 is formed of an elastic material. The sample-container holding member 80 is formed of a material having a reflectance equal to or more than a certain value. For example, the sample-container holding member 80 is formed of Teflon (registered trademark) or Spectralon (registered trademark). The sample-container holding member 80 includes the support portion 81 fixed to the fixing member 70 and the container attaching portion 82 provided at a front end portion of the support portion 81 in the axial direction and placed in the integrator 20. The support portion 81 and the container attaching portion 82 are separately formed.

Figure 6:
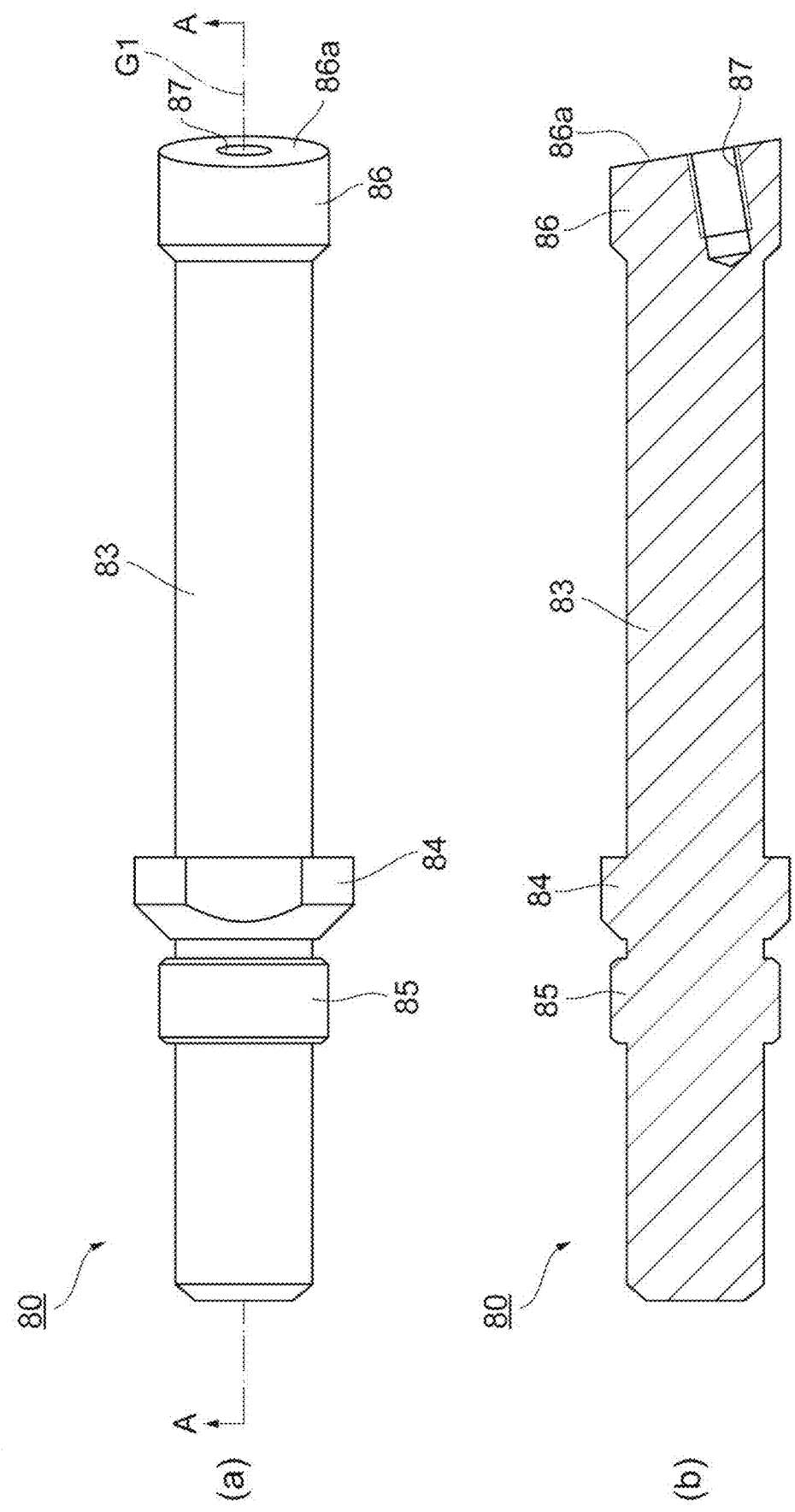
FIG. 6($a$) is a side view of a support portion of the sample-container holding member.

FIG. 6(a) is a side view of the support portion 81 of the sample-container holding member 80. FIG. 6(b) is a cross-sectional view taken along a line A-A in FIG. 6(a). As illustrated in FIGS. 2 to 4 and FIGS. 6(a) and 6(b), the support portion 81 includes the columnar support column body 83 having a central axis G1. A prismatic-shaped prism portion 84 is formed between the center and the base end (left end in the drawings) of the support column body 83 in the axial direction.

The prism portion 84 is a rectangular-shaped portion formed by extending the support column body 83 outward in the radial direction. It is assumed that the prism portion 84 has a rectangular cross section orthogonal to the axial direction. The shape of the cross section of the prism portion 84 is a rectangle and corresponds to the shape of the cross section of the rectangular hole 78 of the fixing member 70. The prism portion 84 abuts against an inner surface of the rectangular hole 78. That is, the prism portion 84 is provided in a portion of the support portion 81 having contact with the fixing member 70. The base end of the prism portion 84 is tapered to be inclined relative to the axial direction.

At a position of the support column body 83 close to the base end of the prism portion 84, a columnar first large diameter portion 85 having a larger diameter than the support column body 83 is formed. At a front end portion of the support column body 83, a columnar second large diameter portion 86 having a larger diameter than the support column body 83 is formed. A front end surface of the second large diameter portion 86 (front end portion of support portion 81) is an inclined surface 86a inclined with respect to a surface perpendicular to the axial direction. A screw hole 87 into which a screw N (refer to FIG. 2) for detachably fixing the container attaching portion 82 is formed in the inclined surface 86a.

A part of the support portion 81 between the first large diameter portion 85 and the second large diameter portion 86 is inserted into the cylindrical hole 75 of the fixing member 70. In this state, the prism portion 84 is placed in (fitted into) the rectangular hole 78 of the fixing member 79 without a gap and has contact with and engaged with the inner surface of the rectangular hole 78. With this structure, the support portion 81 is fixed to the fixing member 70 with the axial direction which is orthogonal to an optical axis direction K of the excitation light (refer to FIG. 2). In the support portion 81, the prism portion 84 has contact with the rectangular hole 78 to be positioned in a rotational direction around the axis, and displacement in the rotation direction is restricted.

Figure 7:
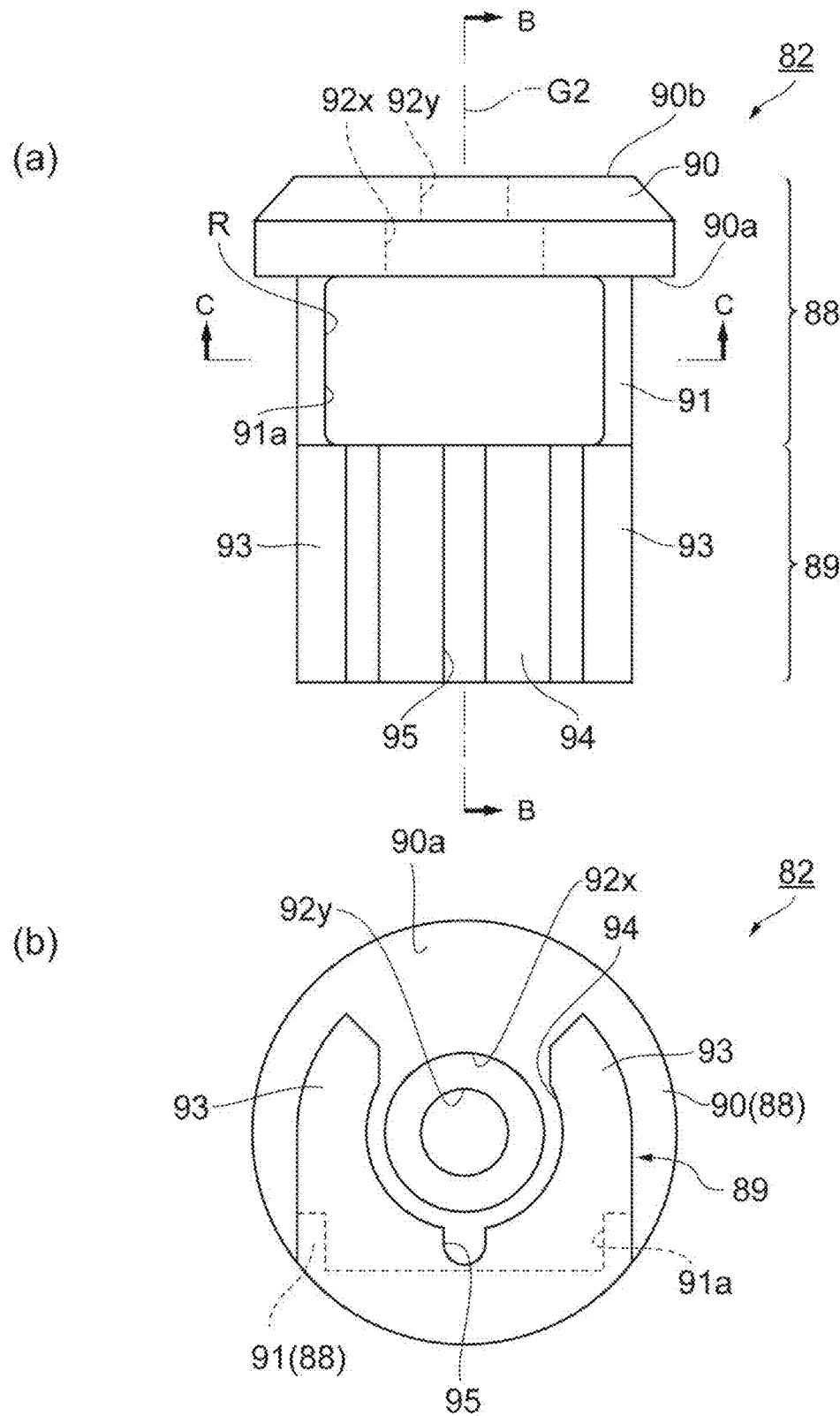
FIG. 7($a$) is a front view of a container attaching portion of the sample-container holding member.

FIG. 7(a) is a front view of the container attaching portion 82 of the sample-container holding member 80. FIG. 7(b) is a bottom view of the container attaching portion 82 of the sample-container holding member 80. FIG. 8(a) is a cross-sectional view taken along a line B-B in FIG. 7(a). FIG. 8(b) is a cross-sectional view taken along a line C-C in FIG. 7(a). As illustrated in FIGS. 2 to 4 and FIGS. 7(a) to 8(b), the container attaching portion 82 is a portion where the sample container 40 is detachably attached. The container attaching portion 82 has a central axis G2. The container attaching portion 82 includes a housing portion 88 for housing the cap 42 and a holding portion 89 for detachably holding the cell 41. The housing portion 88 forms a base end side of the container attaching portion 82. The holding portion 89 forms a front end side of the container attaching portion 82.

The housing portion 88 includes a base portion 90 and a side portion 91 erected on the base portion 90. The base portion 90 and the side portion 91 define an accommodating space R accommodating the cap 42. The base portion 90 has a disc-like shape having the central axis G2 as a base axis. An outer diameter of the base portion 90 is larger than an outer diameter of the cap 42. One surface 90a of the base portion 90 faces a top surface 41a of the cap 42 (refer to FIG. 10). On the surface 90a of the base portion 90, a recess 92x having a circular cross section is formed. In the bottom surface of the recess 92x, a through-hole 92y passing through the base portion 90 to the other surface 90b of the base portion 90 is formed.

The side portion 91 is provided (erected) to stand on a part of the outer peripheral portion of the surface 90a of the base portion 90 along the central axis G2. Specifically, when it is assumed that a side of the container attaching portion 82 placed in the integrator 20 where the excitation light enters be referred to as "light incident side", the side portion 91 is provided to be projected from a part of the side opposite to the light incident side of the surface 90a. The outer side surface (opposite to the light incident side) of the side portion 91 is a curved surface along the shape of the base portion 90. A recess 91a having a rectangular cross section is formed in the inner surface (light incident side) of the side portion 91. The recess 91a forms a gap C (refer to FIG. 10) between the recess 91a and the cap 42 so as not to have contact with the contained cap 42.

The holding portion 89 is continuously provided to the front end portion of the side portion 91. The holding portion 89 has a tubular shape of which the light incident side is notched. The holding portion 89 includes a pair of arms 93 which is curved so as to surround the central axis G2. An inner surface 94 of each of the pair of arms 93 has a C-shaped cross section orthogonal to the central axis G2. That is, the holding portion 89 has the inner surface 94 having a C-shaped cross section orthogonal to the central axis G2. The C-shape of the inner surface 94 is opened toward the light incident side. The inner surface 94 is a curved surface corresponding to an outer peripheral surface (outer surface) of the cell 41. Here, the inner diameter of the inner surface 94 is smaller than the outer diameter of the cell 41.

The holding portion 89 holds the sample container 40 by having contact with at least three points on the outer peripheral surface of the cell 41. Specifically, the holding portion 89 brings the inner surface 94 into contact with the outer peripheral surface of the cell 41 and holds the sample container 40 in a state where the central axis G2 is arranged along the longitudinal direction of the cell 41. In other words, the C-shaped inner surface 94 of the holding portion 89 is engaged with the outer peripheral surface of the cell 41. The holding portion 89 clamps the outer peripheral surface of the cell 41 with the pair of arms 93. The holding portion 89 holds the cell 41 while bringing the inner surface 94 into contact with the outer peripheral surface of the cell 41.

On the inner surface 94, a groove 95 extending along the central axis G2 is formed. The groove 95 extends in a direction perpendicular to (intersecting with) the C-shaped cross section of the inner surface 94. The groove 95 is a U-shaped groove having a U-shaped cross section. The groove 95 is provided at the center position of the C shape of the inner surface 94. The groove 95 extends along the central axis G2 in the central portion of the inner surface 94 as viewed from the light incident side. The groove 95 is arranged at a position where the pair of arms 93 has a symmetrical structure via the groove 95.

In such a container attaching portion 82, the surface 90b of the base portion 90 has contact with the inclined surface 86a of the support portion 81 so that the through-hole 92y of the base portion 90 communicates with the screw hole 87 of the support portion 81. In this state, a screw is inserted into the through-hole 92y and the screw hole 87, and the base portion 90 is fixed to the support portion 81. With this structure, the container attaching portion 82 is detachably fixed to the front end portion of the support portion 81 as the central axis G2 is inclined to the light incident side relative to the central axis G1 of the support portion 81. That is, the central axis G2 is inclined to the light incident side relative to the central axis G1 as separating from the support portion 81. The holding portion 89 holds the sample container 40 in a state where the longitudinal direction of the cell 41 is inclined to one side or another side of the optical axis direction K relative to the direction perpendicular to the optical axis direction K of the excitation light.

In a sample-container placing method for placing the sample container 40 in the integrator 20 via the fixing member 70 by the sample-container holding member 80 described above, first, the support portion 81 is fixed to the fixing member 70 (support portion fixing step). The sample container 40 is attached to the container attaching portion 82 (container attaching step). The fixing member 70 is fixed to the frame 3, and the sample container 40 is placed in the integrator 20 (container placing step). At this time, as described above, the sample container 40 is placed in the integrator 20 in a state where the longitudinal direction of the cell 41 is inclined to the light incident side relative to the direction perpendicular to the optical axis direction K of the excitation light.

Figure 9:
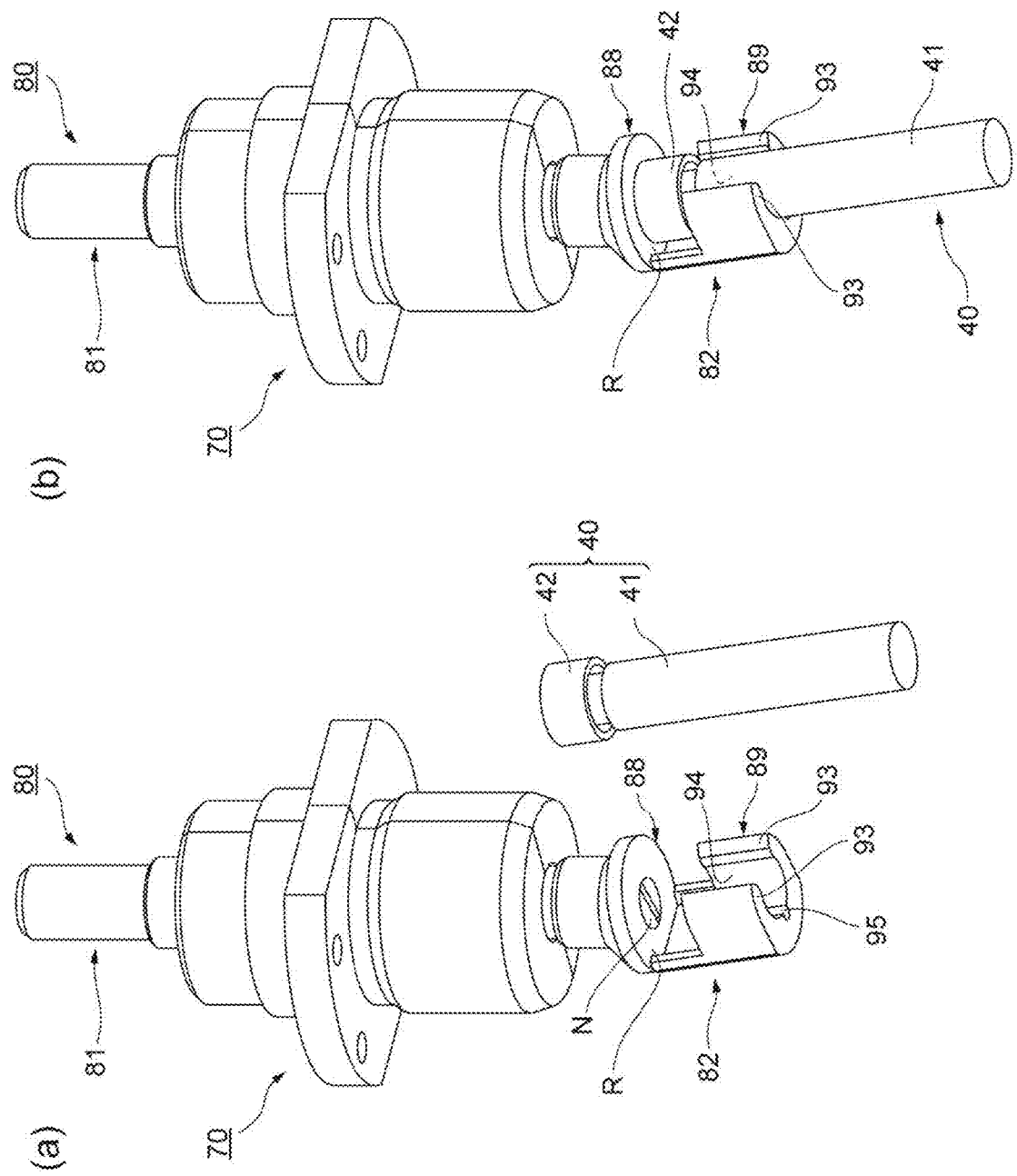
FIG. 9($a$) is a diagram for explaining a case where a sample container is held by the sample-container holding member.
Figure 10:
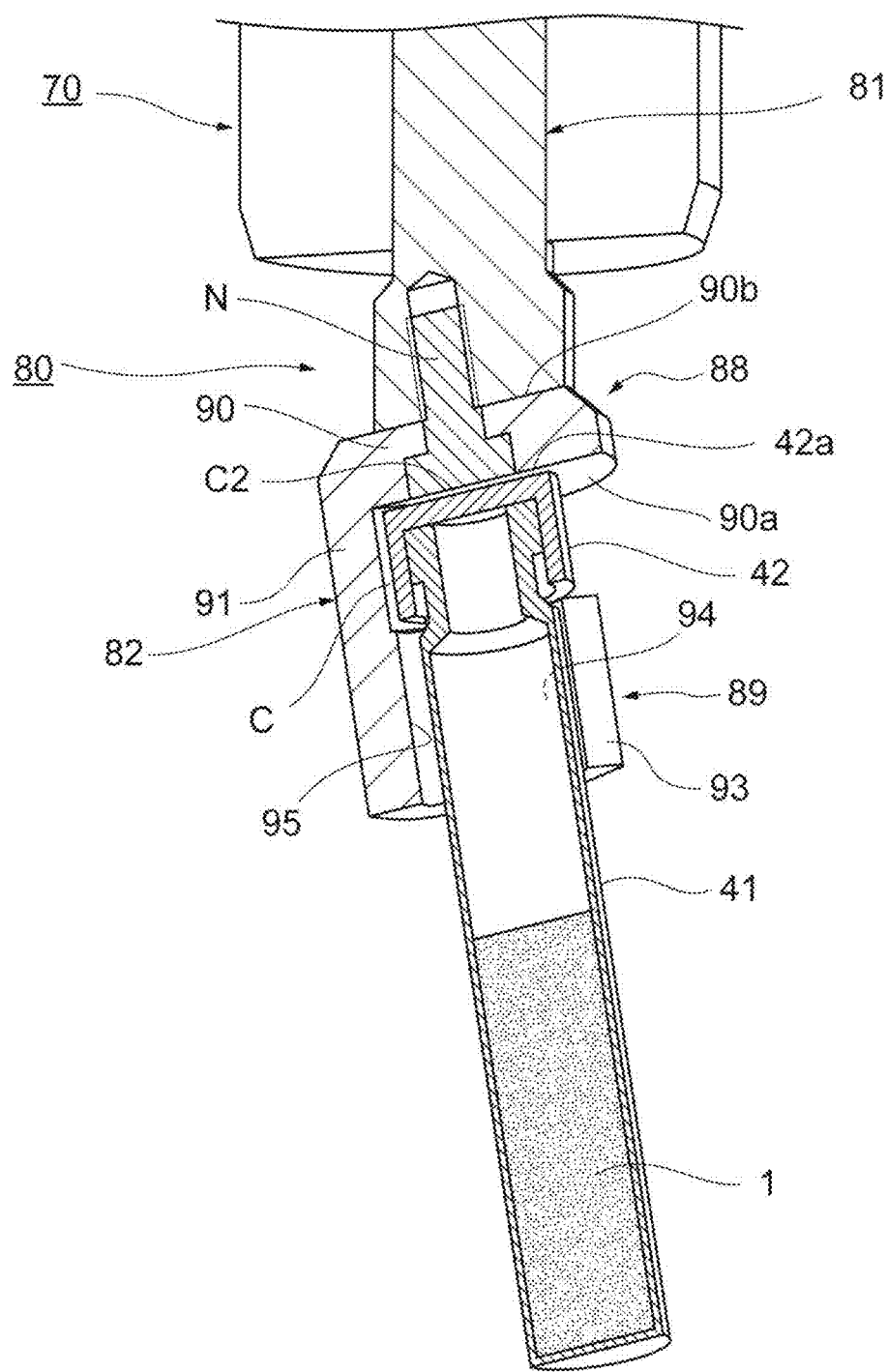
FIG. 10 is a cross-sectional view taken along a line D-D in FIG. 9($b$).

FIG. 9(a) is a diagram for explaining a case where the sample container 40 is held by the sample-container holding member 80. FIG. 9(b) is a diagram of a continuation of FIG. 9(a). FIG. 10 is a cross-sectional view taken along a line D-D in FIG. 9(b). As illustrated in FIGS. 9(a) and 9(b), in a case where the sample container 40 is held by the sample-container holding member 80 (that is, in container attaching step), first, the sample container 40 is positioned on the light incident side of the container attaching portion 82 (opening side of C-shape of inner surface 94) while making the longitudinal direction which is the axial direction of the cell 41 be parallel to the central axis G2 of the container attaching portion 82 (refer to FIG. 3(b)). At this time, the cap 42 faces the accommodating space R of the housing portion 88, and the cell 41 faces the holding portion 89.

Subsequently, the sample container 40 is pressed against the container attaching portion 82. Accordingly, the pair of arms 93 of the holding portion 89 is elastically bent outward, and the cell 41 enters the inner surface 94 while opening the C-shaped opening of the inner surface 94. As a result, the inner surface 94 has contact with the outer peripheral surface of the cell 41, and the cell 41 of the sample container 40 is held by the holding portion 89. In other words, at least three points on the outer surface of the cell 41 have contact with the holding portion 89, and the sample container 40 is held. With this operation, the cap 42 is accommodated in the accommodating space R of the housing portion 88. As illustrated in FIG. 10, the gap C is formed between the side surface of the contained cap 42 and the side portion 91 of the housing portion 88. A gap C2 is formed between a top surface 42a of the contained cap 42 and the base portion 90 of the housing portion 88. As described above, the sample container 40 is detachably fitted into and attached to the container attaching portion 82.

As described above, in the sample-container holding member 80, the holding portion 89 can surely hold the cell 41, not the cap 42, while housing the cap 42 in the housing portion 88. This makes it difficult for the cap 42 to be detached when the sample container 40 is attached/detached to/from the sample-container holding member 80, and leakage of the sample 1 in the cell 41 can be prevented. Therefore, a possibility that contamination in the integrator 20 is caused by the leakage of the sample 1 can be reduced.

In addition, according to the sample-container holding member 80, even a general sample container 40 including a cell 41 and a cap 42 can be easily placed in the integrator 20. Since such a sample container 40 is inexpensive, user's convenience can be enhanced Even when the general sample container 40 is used, the sample container 40 is easily used and can perform measurement with high accuracy. It is possible to provide the light measurement device 100 to a broader user.

Furthermore, by holding the sample container 40 by having contact with at least three points on the outer surface of the cell 41, the sample-container holding member 80 can maintain reproducibility of placing the sample container 40 in the integrator 20. Even when the plurality of sample container 40 is attached/detached to/from the sample-container holding member 80, all the sample containers 40 can be placed at the same angle (inclination state). Therefore, measurement accuracy of the light measurement device 100 can be improved.

In the sample-container holding member 80, the holding portion 89 holds the sample container 40 in a state where the longitudinal direction of the cell 41 is inclined to the light incident side (one side or other side in optical axis direction K) relative to the direction perpendicular to the optical axis direction K of the excitation light. With this structure, the following effects are obtained. That is, all or a part of the excitation light reflected by the cell 41 can be prevented from returning toward the excitation light source 11 (incident opening 22). In a case where the cell 41 is inclined to a direction other than the optical axis direction K and is held, there is a possibility that the cell 41 is not irradiated with the excitation light. Therefore, the cell 41 can be reliably irradiated with the excitation light.

In the sample-container holding member 80, at least a part of a contact portion of the support portion 81 with the fixing member 70, the prism portion 84 having a prismatic shape is formed. With this structure, rotation of the sample-container holding member 80 relative to the fixing member 70 in the rotational direction around the central axis G1 can be prevented. The angle of the sample container 40 in the rotational direction does not change.

Particularly, since the prism portion 84 has a rectangular cross section, when the support portion 81 is assembled to the fixing member 70, for example, if the rotational position of the support portion 81 is wrongly shifted from the correct rotational position by 90°, the support portion 81 cannot be assembled to the fixing member 70. The support portion 81 can be easily positioned in the rotational direction. Therefore, to assemble the support portion 81 to a wrong rotational position can be prevented.

In the sample-container holding member 80, the holding portion 89 has the inner surface 94 having a C-shaped cross section, and the inner surface 94 has contact with the outer peripheral surface of the cell 41 to hold the sample container 40. With this structure, the cell 41 of the sample container 40 can be held by being fitted into the holding portion 89. That is, the sample container 40 can be easily and detachably held.

The sample-container holding member 80 is formed of an elastic material. That is, the holding portion 89 is formed of an elastic material. In this structure, when the sample container 40 is attached/detached to/from the sample-container holding member 80, the C-shaped opening of the holding portion 89 can be opened by using elasticity of the elastic material. The sample container 40 can be more easily held.

In the sample-container holding member 80, the inner diameter of the C-shaped inner surface 94 of the holding portion 89 is smaller than the outer diameter of the cell 41. In this structure, when the cell 41 is held by the holding portion 89, a force to close the C-shape of the holding portion 89 can be applied (apply force to cell 41 to inner side of radial direction) by using the elasticity of the elastic material. With this structure, the sample container 40 can be more reliably held.

In the sample-container holding member 80, the groove 95 is formed in the C-shaped inner surface 94 of the holding portion 89. When the sample container 40 is attached/detached to/from the sample-container holding member 80, the C-shaped opening of the holding portion can be easily opened by the groove 95. Furthermore, the cell 41 can be positioned with reference to the groove 95.

In the sample-container holding member 80, the support portion 81 and the container attaching portion 82 are separately formed. The container attaching portion 82 is detachably fixed to the front end portion of the support portion 81. In this structure, the container attaching portion 82 fixed to the support portion 81 can be replaced, for example, according to the shape of the sample container 40. The sample containers 40 having various shapes can be easily held.

In the sample-container holding member 80, the housing portion 88 includes the base portion 90 facing the top surface 42a of the cap 42 and the side portion 91 erected on the base portion 90. The base portion 90 and the side portion 91 define the accommodating space R. The recess 91a is formed in the side portion 91. The gap C is formed between the cap 42 accommodated in the accommodating space and the side portion 91. With this structure, when the sample container 40 is attached/detached to/from the sample-container holding member 80, a specific structure can be made so that the cap 42 does not have contact with the sample-container holding member 80, and it can be more difficult to remove the cap 42. Misalignment of the cell 41 held by the holding portion 89 caused by interference between the cap 42 and the housing portion 88 can be prevented.

Since the light measurement device 100 includes the sample-container holding member 80, the action effect obtained by the sample-container holding member 80, that is, the effect of reducing the possibility of contamination in the integrator 20 caused by the leakage of the sample 1 can be obtained.

In the sample-container placing method, the holding portion 89 can reliably hold the cell 41, not the cap 42 while the housing portion 88 contains the cap 42. This makes it difficult for the cap 42 to be detached when the sample container 40 is attached/detached to/from the sample-container holding member 80, and leakage of the sample 1 in the cell 41 can be prevented. Therefore, it is possible to reduce possibility that the leakage of the sample 1 contaminates the inside of the integrator 20.

In the sample-container placing method, the sample container 40 is placed in a state where the longitudinal direction of the cell 41 is inclined to the light incident side (one side or the other side in optical axis direction K) relative to the direction perpendicular to the optical axis direction K of the excitation light to be emitted to the cell 41. With this placement, all or a part of the excitation light reflected by the cell 41 can be prevented from returning toward the excitation light source 11. In a case where the cell 41 is placed as being inclined to the direction other than the optical axis direction K, there is a possibility that the cell 41 is not irradiated with the excitation light. Therefore, with this sample-container placing method, the cell 41 can be reliably irradiated with the excitation light.

In the sample-container placing method, the sample container 40 is attached to the holding portion 89 by being fitted into the holding portion 89. Accordingly, the sample container 40 can be easily and detachably held.

The elastic member 77 is provided in the rectangular hole 78 of the fixing member 70. With this structure, the support column body 83 of the support portion 81 of the sample-container holding member 80 is pressed and held by the elastic member 77. It is possible to reliably fix the sample-container holding member 80 to the fixing member 70.

Figure 11:
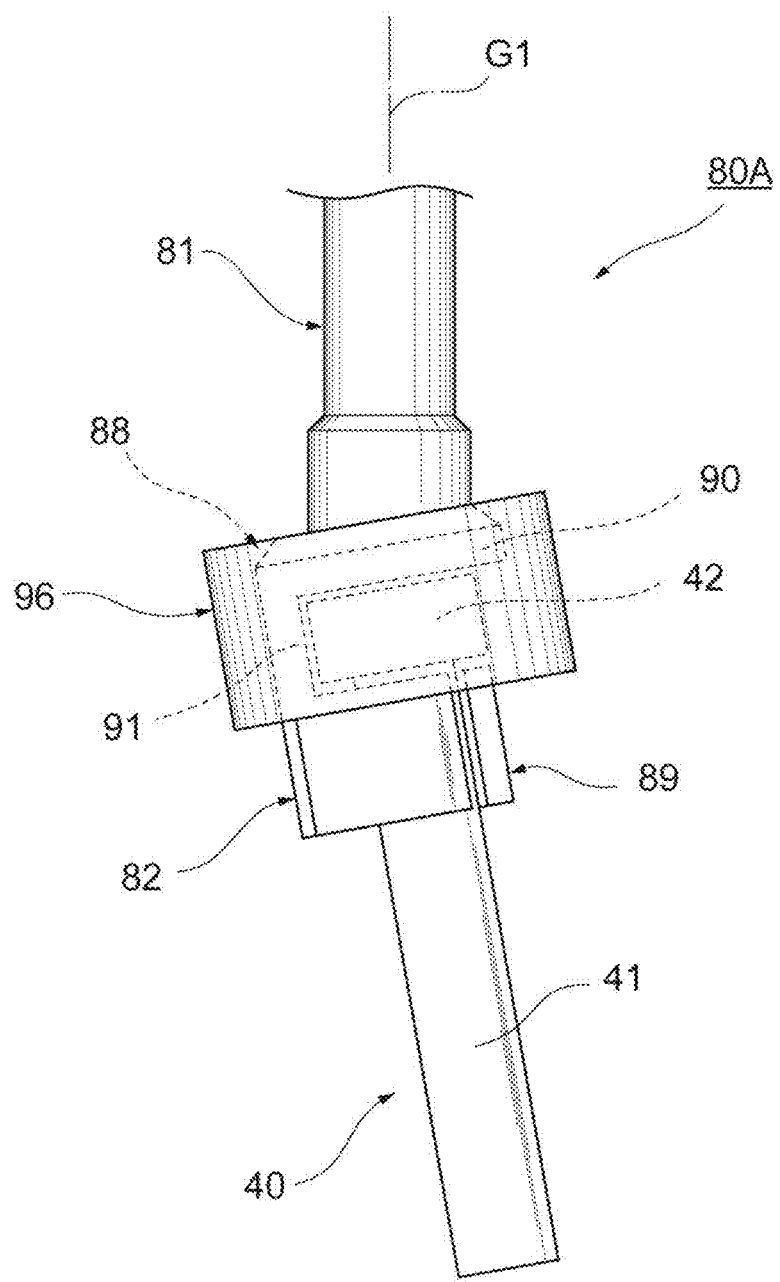
FIG. 11 is a perspective view of a sample-container holding member according to a modification.

FIG. 11 is a perspective view of a sample-container holding member 80A according to a modification. As illustrated in FIG. 11, the sample-container holding member 80A includes a tubular light shielding portion 96. The light shielding portion 96 is placed outside the housing portion 88. The light shielding portion 96 is provided so as to surround the cap 42 contained in the housing portion 88. The light shielding portion 96 shields the cap 42 from the excitation light to be irradiated. The light shielding portion 96 is formed of a material having light shielding property relative to the excitation light. For example, the light shielding portion 96 is formed of a material different from the cell 41 (for example, resin). Furthermore, for example, the light shielding portion 96 may be coated with a high-diffusion reflective substance such as barium sulfate which is the same material as the inner surface of the integrator 20.

In the sample-container holding member 80A, the cap 42 of the sample container 40 held by the holding portion 89 is covered with the light shielding portion 96 so that absorption of the excitation light by the cap 42 can be prevented. Measurement errors of the spectroscopic detector 45 (refer to FIG. 1) can be reduced. The influence of the absorption of the excitation light by the cap 42 on the measurement accuracy can be reduced.

Note that, for example, the light shielding portion 96 may be detachably fixed to the container attaching portion 82. Furthermore, for example, the light shielding portion 96 may be formed to move along the central axis G1. In this case, the light shielding portion 96 is moved to a position where the light shielding portion 96 covers the cap 42 after the sample container 40 has been attached to the container attaching portion 82.

Figure 12:
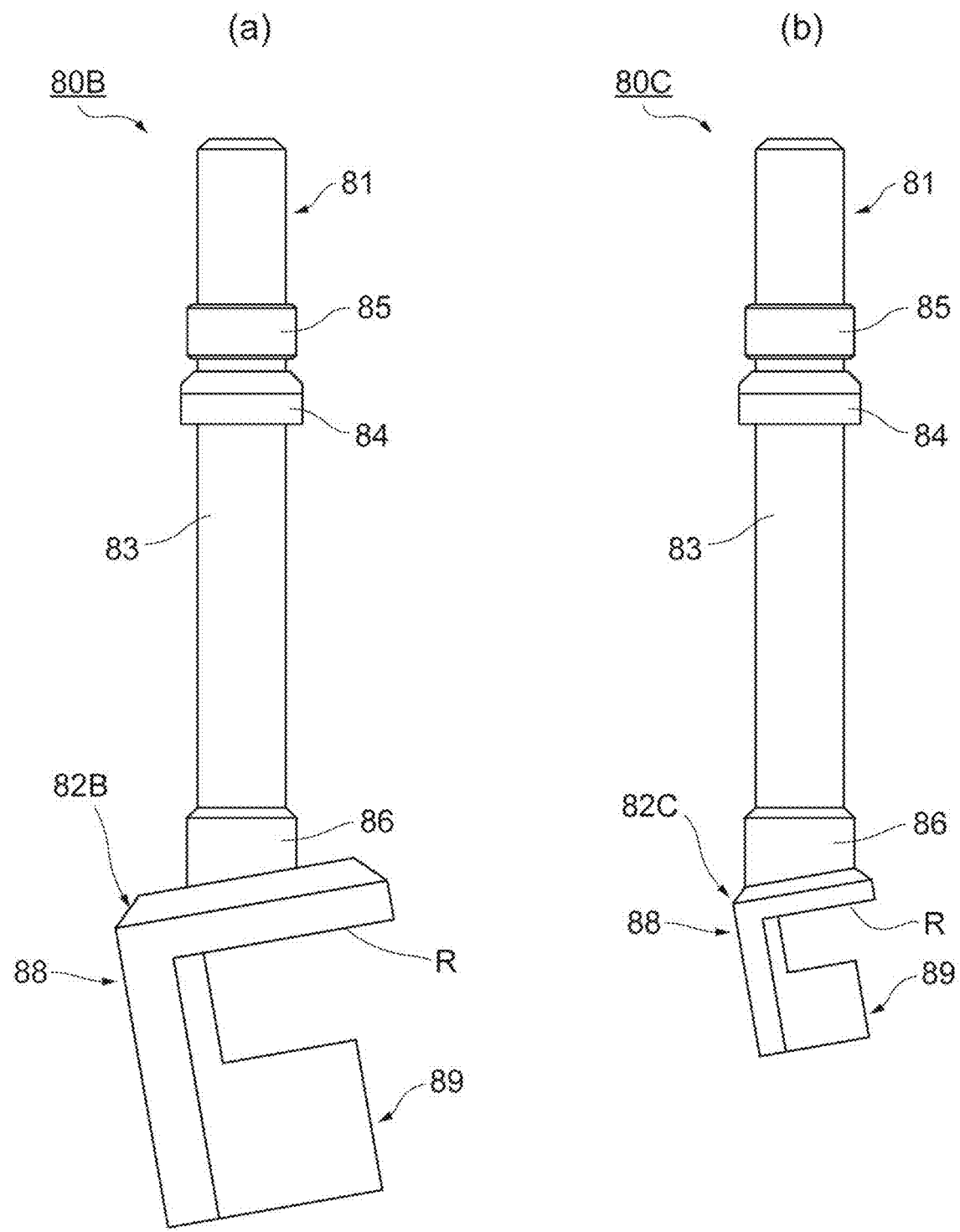
FIG. 12($a$) is a side view of a sample-container holding member according to another modification.

FIG. 12(a) is a side view of a sample-container holding member 80B according to a modification. FIG. 12(b) is a side view of a sample-container holding member 80C according to a modification. As described above, since the container attaching portion 82 is detachably fixed to the end of the support portion 81, the container attaching portion 82 can be replaced with various container attaching portions. For example, the sample-container holding member includes a plurality of kinds of container attaching portions 82 including the holding portions 89 having various shapes, and any one of the container attaching portions 82 according to the sample container 40 may be attached to the support portion 81.

As illustrated in FIG. 12(a), in a case where another sample container which is larger than the sample container 40 is held, the sample-container holding member 80B may be employed. In the sample-container holding member 80B, a container attaching portion 82B of which dimensions are larger than those of the container attaching portion 82 is fixed to the end of the support portion 81. As illustrated in FIG. 12(b), in a case where another sample container which is smaller than the sample container 40 is held, the sample-container holding member 80C may be employed. In the sample-container holding member 80C, a container attaching portion 82C of which dimensions are smaller than those of the container attaching portion 82 is fixed to the end of the support portion 81. In a case where a sample container having a prismatic cell is held, a container attaching portion of which an inner surface of a holding portion corresponds to the outer surface of the cell may be fixed to the end of the support portion 81.

That is, the light measurement device and the sample-container holding member include a plurality of container attaching portions including a plurality of holding portions having different shapes from each other, and the container attaching portion fixed to the end of the support portion 81 may be replaced with any one of the plurality of container attaching portions. Before the sample container 40 is attached to the container attaching portion 82 (before container attaching step), the container attaching portion 82 provided in the support portion 81 may be replaced with another container attaching portion different from the container attaching portion 82. Accordingly, the sample containers 40 having various shapes can be easily held.

Figure 13:
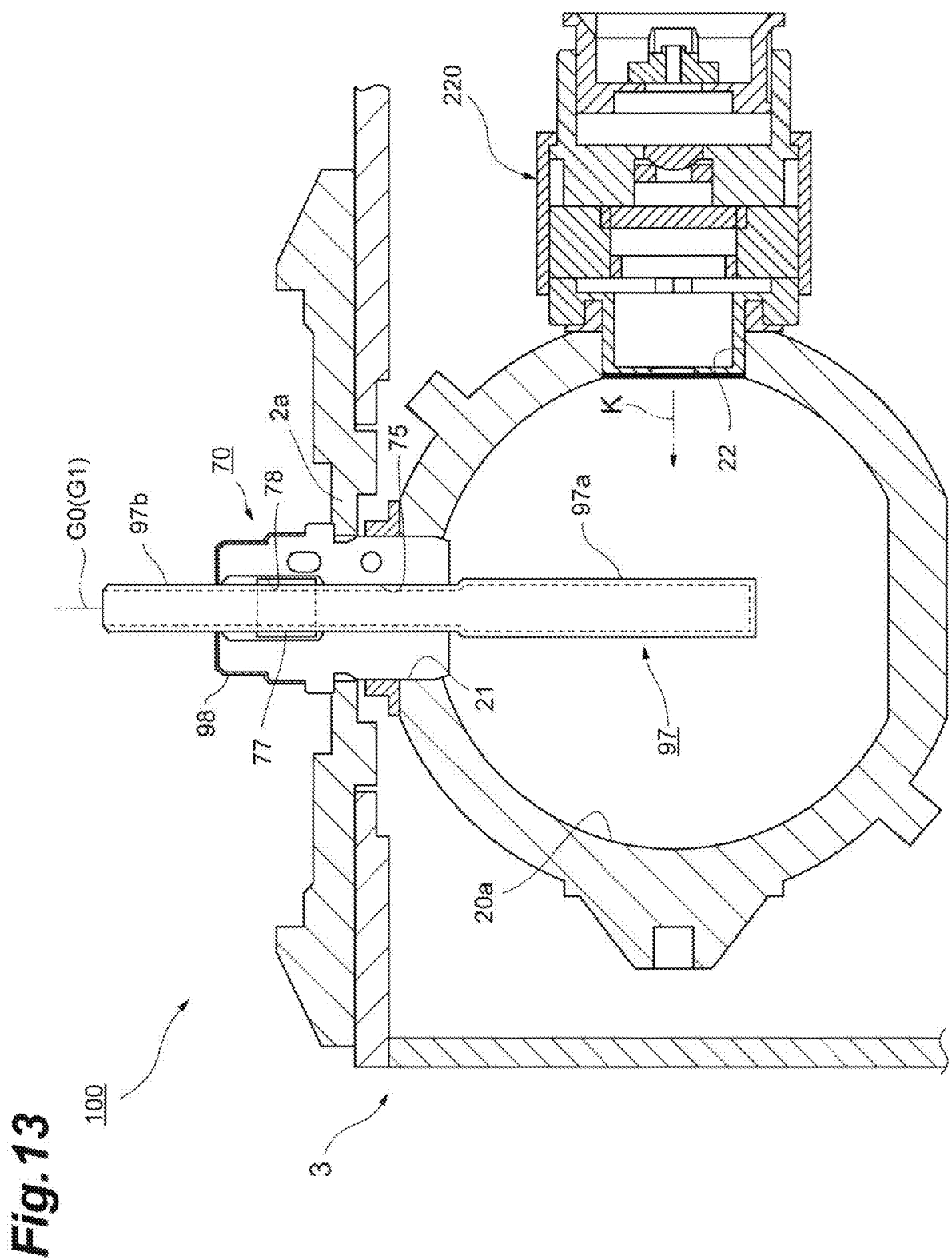
FIG. 13 is a side sectional view of a light measurement device in a case where another sample container is directly attached to an integrator with a fixing member.

FIG. 13 is a side sectional view of the light measurement device 100 in a case where another sample container 97 is directly attached to the integrator 20 with the fixing member 70. As illustrated in FIG. 13, in the light measurement device 100, it is not necessary to use the sample-container holding member 80 (refer to FIG. 2) by employing the sample container 97. That is, the fixing member 70 can directly attach the sample container 97 to the integrator 20 without having the sample-container holding member 80 (refer to FIG. 2) therebetween.

The sample container 97 is a unique optical cell corresponding to the fixing member 70. The sample container 97 is formed of quartz or synthetic quartz. The sample container 97 includes a square pillar-shaped hollow cell main body 97a in which the sample 1 is stored and a rod-like branch pipe 97b extending in a tubular shape from the cell main body 97a. The branch pipe 97b of the sample container 97 is inserted into and fixed to the cylindrical hole 75 of the fixing member 70. The branch pipe 97b is sandwiched and held between the first semi-cylindrical portion 72A and the second semi-cylindrical portion 72B as being pressed by the elastic member 77. Accordingly, the fixing member 70 holds the sample container 97 in a state where the cell main body 97a containing the sample 1 is placed in the integrator 20.

That is, the light measurement device may further include the sample container 97. In this case, by using the sample container 97, the light measurement device can perform measurement with high accuracy and can use ultraviolet light as excitation light. Accordingly, it is possible to appropriately select the use of the sample-container holding member 80 and the use of the sample container 97, and measurement according to accuracy or conditions can be performed.

The embodiment of the present invention has been described above. However, the present invention is not limited to the embodiment described above.

In the embodiment, the structure of the housing portion 88 and the holding portion 89 is a structure in which the sample container 40 is engaged from the light incident side. However, the structure is not limited to this. For example, the structure of the housing portion 88 and the holding portion 89 may be a structure in which the sample container 40 (C-shaped opening side) is engaged to the side opposite to the light incident side and may be a structure in which the sample container 40 is engaged from a direction other than that.

In the embodiment, the cell 41 of the sample container 40 is formed of glass. However, the cell 41 may be formed of quartz. In the embodiment, the holding portion 89 holds the sample container 40 in a state where the longitudinal direction of the cell 41 is inclined to the light incident side relative to the central axis G1. However, the holding portion 89 may hold the sample container 40 in a state where the longitudinal direction of the cell 41 is inclined to the other side of the light incident side relative to the central axis G1.

In the embodiment, the integrating sphere is used as the integrator 20. However, it is preferable that a means for spatially integrating the light inside the integrator 20 (optical component) be used. For example, an integrating hemisphere disclosed in JP 2009-103654 A may be used. The holding portion 89 according to the embodiment has a structure in which the inner surface 94 has contact with the outer peripheral surface of the cell 41. However, the holding portion 89 is not limited to this, and the structure may be used in which the holding portion 89 has contact with at least three points on the outer surface of the cell 41 (it is preferable that the holding portion 89 is capable of having contact with at least three points of outer surface of cell 41). The support portion fixing step, the container attaching step, and the container placing step are performed in no particular order, and may be performed in any order.

REFERENCE SIGNS LIST

1 sample
11 excitation light source (light generation unit)
20 integrator
40 sample container
41 cell
42 cap
42a top surface
50 spectroscopic detector (light detector)
51 analysis unit
70 fixing member
80, 80A, 80B, 80C sample-container holding member
81 support portion
82 container attaching portion
88 housing portion
89 holding portion
90 base portion
91 side portion
94 inner surface
95 groove
96 light shielding portion
100 light measurement device
C gap
K optical axis direction
R accommodating space

The invention claimed is:

1. A sample-container holder detachably attached to an integrator via a sample-container holder attachment and holding a sample container comprising a cell containing a sample and a cap in a state where the sample container is placed in the integrator, the sample-container holder comprising:
    a pillar-shaped supporter fixed to the sample-container holder attachment; and
    a container attachment provided at an end of the supporter in an axial direction and to which the sample container is attached, wherein
    the container attachment comprises:
    a housing portion housing the cap; and
    a holder having contact with at least three points on an outer surface of the cell and holding the sample container,
    wherein the holder holds the sample container in a state where a longitudinal direction of the cell is inclined to one side or another side in an optical axis direction relative to a direction perpendicular to the optical axis direction of excitation light to be emitted to the cell.

2. The sample-container holder according to claim 1, wherein
    the supporter and the container attachment are separately formed, and
    the container attachment is detachably fixed to the end of the supporter in the axial direction.

3. The sample-container holder according to claim 1, further comprising:
    a light shield provided so as to surround the cap contained in the housing portion.

4. A light measurement device measuring measurement light generated by irradiating a sample with excitation light, the light measurement device comprising:
    the sample-container holder according to claim 1;
    the integrator in which the sample container is placed;
    the sample-container holder attachment configured to detachably attach the sample-container holder to the integrator;
    a light generator configured to generate the excitation light;
    a light detector configured to detect the measurement light; and
    an analyzer configured to analyze a detection result of the light detector.

5. A sample-container holder detachably attached to an integrator via a sample-container holder attachment and holding a sample container comprising a cell containing a sample and a cap in a state where the sample container is placed in the integrator, the sample-container holder comprising:
    a pillar-shaped supporter fixed to the sample-container holder attachment; and a container attachment provided at an end of the supporter in an axial direction and to which the sample container is attached, wherein the container attachment comprises:

a housing portion housing the cap; and a holder having contact with at least three points on an outer surface of the cell and holding the sample container, wherein at least a part of a contact portion of the supporter with the sample-container holder attachment has a prismatic shape.

6. A sample-container holder detachably attached to an integrator via a sample-container holder attachment and holding a sample container comprising a cell containing a sample and a cap in a state where the sample container is placed in the integrator, the sample-container holder comprising:

a pillar-shaped supporter fixed to the sample-container holder attachment; and a container attachment provided at an end of the supporter in an axial direction and to which the sample container is attached, wherein the container attachment comprises:

a housing portion housing the cap; and a holder having contact with at least three points on an outer surface of the cell and holding the sample container, wherein the holder has an inner surface having a C-shaped cross section, and the inner surface has contact with an outer surface of the cell so that the holder holds the sample container.

7. The sample-container holder according to claim 6, wherein the holder is formed of an elastic material.

8. The sample-container holder according to claim 7, wherein an inner diameter of the C-shaped inner surface of the holder is smaller than an outer diameter of the cell.

9. The sample-container holder according to claim 6, wherein in the C-shaped inner surface of the holder, a groove extending in a direction intersecting with the C-shaped cross section is formed.

10. A sample-container holder detachably attached to an integrator via a sample-container holder attachment and holding a sample container comprising a cell containing a sample and a cap in a state where the sample container is placed in the integrator, the sample-container holder comprising:

a pillar-shaped supporter fixed to the sample-container holder attachment; and a container attachment provided at an end of the supporter in an axial direction and to which the sample container is attached, wherein the container attachment comprises:

a housing portion housing the cap; and a holder having contact with at least three points on an outer surface of the cell and holding the sample container, wherein the housing portion comprises a base portion facing a top surface of the cap and a side portion provided to be erected on the base portion, the base portion and the side portion define an accommodating space accommodating the cap, and a gap is formed between the cap contained in the accommodating space and the side portion.

11. A sample-container placing method for placing a sample container comprising a cell containing a sample and a cap in an integrator via a fixing member by a sample-container holder which comprises a supporter and a container attachment provided at an end of the supporter in an axial direction, the container attachment comprises a housing portion and a holder, the sample-container placing method comprising:

fixing the supporter to the fixing member;

attaching the sample container to the container attachment; and placing the sample container in the integrator, wherein in the attaching the sample container, while the cap is contained in the housing portion, the sample container is held by making the holder have contact with at least three points on an outer of the cell, wherein in the placing the sample container, the sample container is placed in a state where a longitudinal direction of the cell is inclined to one side or another side in an optical axis direction relative to a direction perpendicular to the optical axis direction of excitation light to be emitted to the cell.

12. A sample-container placing method for placing a sample container comprising a cell containing a sample and a cap in an integrator via a fixing member by a sample-container holder which comprises a supporter and a container attachment provided at an end of the supporter in an axial direction, the container attachment comprises a housing portion and a holder, the sample-container placing method comprising:

fixing the supporter to the fixing member;

attaching the sample container to the container attachment; and placing the sample container in the integrator, wherein in the attaching the sample container, while the cap is contained in the housing portion, the sample container is held by making the holder have contact with at least three points on an outer of the cell, wherein in the attaching the sample container, the sample container is attached to the holder by being fitted into the holder.

13. A sample-container placing method for placing a sample container comprising a cell containing a sample and a cap in an integrator via a fixing member by a sample-container holder which comprises a supporter and a container attachment provided at an end of the supporter in an axial direction, the container attachment comprises a housing portion and a holder, the sample-container placing method comprising:

fixing the supporter to the fixing member;

attaching the sample container to the container attachment; and placing the sample container in the integrator, wherein in the attaching the sample container, while the cap is contained in the housing portion, the sample container is held by making the holder have contact with at least three points on an outer of the cell, wherein before the attaching the sample container, the container attachment provided in the supporter is replaced with another container attachment different from the container attachment.

* * * * *